(12) United States Patent
Toy et al.

(10) Patent No.: US 8,382,591 B2
(45) Date of Patent: Feb. 26, 2013

(54) GRAPHICAL USER INTERFACE, SYSTEM AND METHOD FOR IMPLEMENTING A GAME CONTROLLER ON A TOUCH-SCREEN DEVICE

(75) Inventors: Michael Toy, Los Altos, CA (US); Emily Adams, Mountain View, CA (US); Stephen G. Perlman, Palo Alto, CA (US)

(73) Assignee: OL2, Inc., Palo Alto, CA (US)

( * ) Notice: Subject to any disclaimer, the term of this patent is extended or adjusted under 35 U.S.C. 154(b) by 34 days.

(21) Appl. No.: 13/016,785

(22) Filed: Jan. 28, 2011

(65) Prior Publication Data
US 2011/0300934 A1    Dec. 8, 2011

Related U.S. Application Data

(60) Provisional application No. 61/351,268, filed on Jun. 3, 2010.

(51) Int. Cl.
*A63F 9/24* (2006.01)
(52) U.S. Cl. ........................................ 463/37
(58) Field of Classification Search .................. 463/37
See application file for complete search history.

(56) References Cited

U.S. PATENT DOCUMENTS

| | | | |
|---|---|---|---|
| 4,582,324 A | 4/1986 | Koza et al. | |
| 5,956,025 A | 9/1999 | Goulden et al. | |
| 6,014,706 A | 1/2000 | Cannon et al. | |
| 6,665,872 B1 | 12/2003 | Krishnamurthy et al. | |
| 6,699,127 B1 | 3/2004 | Lobb et al. | |
| 6,850,252 B1* | 2/2005 | Hoffberg | 715/716 |
| 2002/0034980 A1 | 3/2002 | Lemmons et al. | |
| 2002/0101442 A1 | 8/2002 | Costanzo et al. | |
| 2002/0111995 A1* | 8/2002 | Mansour et al. | 709/203 |
| 2002/0129096 A1* | 9/2002 | Mansour et al. | 709/203 |
| 2003/0079026 A1 | 4/2003 | Watanabe et al. | |
| 2003/0177187 A1 | 9/2003 | Levine et al. | |

(Continued)

FOREIGN PATENT DOCUMENTS

| | | |
|---|---|---|
| EP | 0 502 673 | 9/1992 |
| EP | 0 554 586 | 8/1993 |

(Continued)

OTHER PUBLICATIONS

International Search Report & Written Opinion from foreign counterpart PCT Application No. PCT/US2012/040940 mailed Aug. 23, 2012, 9 pages.

(Continued)

*Primary Examiner* — Corbett B Coburn
(74) *Attorney, Agent, or Firm* — Blakely, Sokoloff, Taylor & Zafman, LLP

(57) ABSTRACT

A touch-screen apparatus comprises: a touch-screen display for displaying images and receiving user input in response to a user touching the touch screen display; a network interface for establishing a network connection with a gaming server executing a video game in response to user input from the apparatus, the gaming server compressing video output from the video game to generate interactive compressed streaming video, and transmitting the interactive compressed streaming video generated by the video game over the network connection to the touch-screen apparatus; a touch-screen graphical user interface (GUI) comprising: a plurality of user input elements providing user input in response to the user selecting the user input elements on the touch screen display; wherein the user input is transmitted from the touch-screen apparatus to the gaming server to control the execution of the video game.

28 Claims, 2 Drawing Sheets

U.S. PATENT DOCUMENTS

| | | | |
|---|---|---|---|
| 2003/0226150 | A1 | 12/2003 | Berberet et al. |
| 2004/0097280 | A1 | 5/2004 | Gauselmann |
| 2004/0111755 | A1 | 6/2004 | Perlman |
| 2004/0207724 | A1 | 10/2004 | Crouch et al. |
| 2004/0263626 | A1 | 12/2004 | Piccionelli |
| 2005/0024341 | A1 | 2/2005 | Gillespie et al. |
| 2005/0104889 | A1 | 5/2005 | Clemie et al. |
| 2006/0230428 | A1 | 10/2006 | Craig et al. |
| 2007/0060343 | A1 | 3/2007 | Sakaguchi et al. |
| 2007/0061126 | A1 | 3/2007 | Russo et al. |
| 2007/0083899 | A1 | 4/2007 | Compton et al. |
| 2007/0243925 | A1 | 10/2007 | LeMay et al. |
| 2007/0281789 | A1 | 12/2007 | Wiltshire et al. |
| 2008/0238879 | A1 | 10/2008 | Jaeger et al. |
| 2008/0250120 | A1 | 10/2008 | Mick et al. |
| 2009/0300701 | A1 | 12/2009 | Karaoguz et al. |
| 2011/0126255 | A1 | 5/2011 | Perlman et al. |
| 2011/0248927 | A1* | 10/2011 | Michaelis et al. ............ 345/173 |
| 2011/0285636 | A1* | 11/2011 | Howard et al. ............... 345/173 |
| 2011/0314093 | A1* | 12/2011 | Sheu et al. ................... 709/203 |

FOREIGN PATENT DOCUMENTS

| | | |
|---|---|---|
| EP | 1 132 122 | 9/2001 |
| EP | 1 637 197 | 3/2006 |
| GB | 2 347 3332 | 8/2000 |
| WO | WO-95/30465 | 11/1995 |
| WO | WO-00/44169 | 7/2000 |
| WO | WO-01/41447 | 6/2001 |
| WO | WO-01/75545 | 10/2001 |
| WO | WO-03/047710 | 6/2003 |
| WO | WO-03/075116 | 9/2003 |
| WO | WO-2005/045551 | 5/2005 |
| WO | WO-2006/034124 | 3/2006 |
| WO | WO-2006/124811 | 11/2006 |
| WO | WO-2007/008356 | 1/2007 |
| WO | WO-2007/119236 | 10/2007 |
| WO | WO-2008/042098 | 4/2008 |
| WO | 2009/078319 A1 | 6/2009 |

OTHER PUBLICATIONS

PCT "Notification of Transmittal of the International Search Report and the Written Opinion of the International Searching Authority, or the Declaration", Application No. PCT/US2011/038627, mailed Sep. 16, 2011, 8 pages.

Wu, Dapeng, "Transporting Real-time Video over the Internet: Challenges and Approaches", Proceedings of the IEEE, vol. 88, No. 12, Dec. 2000, pp. 1-18.

Nguyen, Cong Duc, "Optimal Assignment of Distributed Servers to Virtual Partitions for the Provision of Immersive Voice Communication in Massively Multiplayer Games", Computer Communications 29 2006, available online Nov. 15, 2005, pp. 1260-1270.

Kubota, Shuji, "High-Quality Frame-Synchronization for Satellite Video Signal Transmission", IEEE Transactions on Aerospace and Electronic Systems, vol. 31, No. 1, Jan. 1995, pp. 430-440.

Duong, Ta Nguyen Binh, "A Dynamic Load Sharing Algorithm for Massively Multiplayer Online Games:", IEEE, 2003, pp. 131-136.

Bungie,"Halo 3 How-to: Saved Films, New ViDOC", http://www.bungie.net/News/content.aspx?type=topnews&link=h3savedfilms, Sep. 20, 2007, pp. 1-8.

\* cited by examiner

GRAPHICAL USER INTERFACE, SYSTEM AND METHOD FOR IMPLEMENTING A GAME CONTROLLER ON A TOUCH-SCREEN DEVICE

CLAIM TO PRIORITY

The application is a continuation-in-part and claims the benefit of U.S. Provisional Application No. 61/351,268 entitled, "Graphical User Interface, System and Method For Implementing A Game Controller On A Touch-Screen Device", filed on Jun. 3, 2010.

TECHNICAL FIELD

The present disclosure relates generally to the field of data processing systems and, more particularly, to a graphical user interface for controlling a game on a touch-screen device.

BRIEF DESCRIPTION OF THE DRAWINGS

A better understanding of the present invention can be obtained from the following detailed description in conjunction with the following drawings, in which.

DESCRIPTION OF EMBODIMENTS OF THE INVENTION

The assignee of the present application has developed an online video gaming system. Certain embodiments of this system are described, for example, in U.S. patent application Ser. No. 12/538,081, filed, Aug. 7, 2009, entitled, "System and Method for Compressing Video Based on Latency Measurements and Other Feedback" and U.S. application Ser. No. 12/359,150, filed Jan. 23, 2009, entitled, "System And Method for Protecting Certain Types of Multimedia Data Transmitted Over A Communication Channel." These applications are sometimes referred to herein as the "co-pending applications" and are incorporated herein by reference.

Described herein is a unique controller and touch-screen graphical user interface (GUI) for controlling online video games as described in the co-pending applications. While the controller and touch screen GUI described below may be used to control "online" games in one embodiment of the invention, the underlying principles of the invention are not limited to "online" games. For example, the controller and touch screen GUI described below may be used to control games being executed locally on the gaming apparatus to which they are connected (in the case of the controller) and/or on which they are displayed (in the case of the GUI).

Figure 1B:
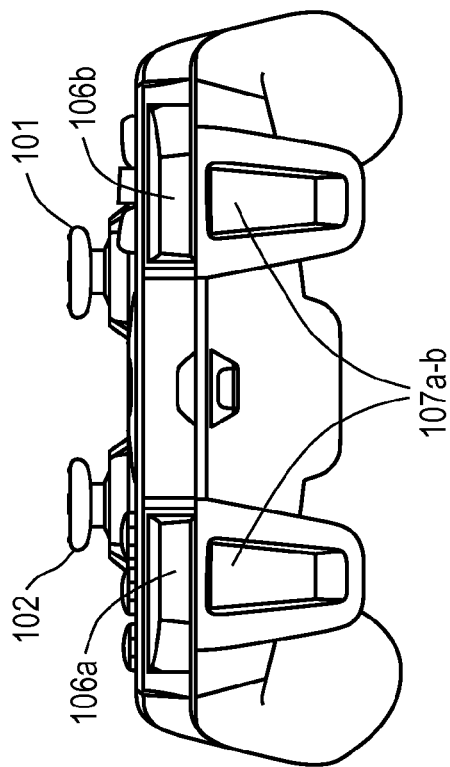
FIGS. 1a-b illustrate a game controller.
Figure 1A:
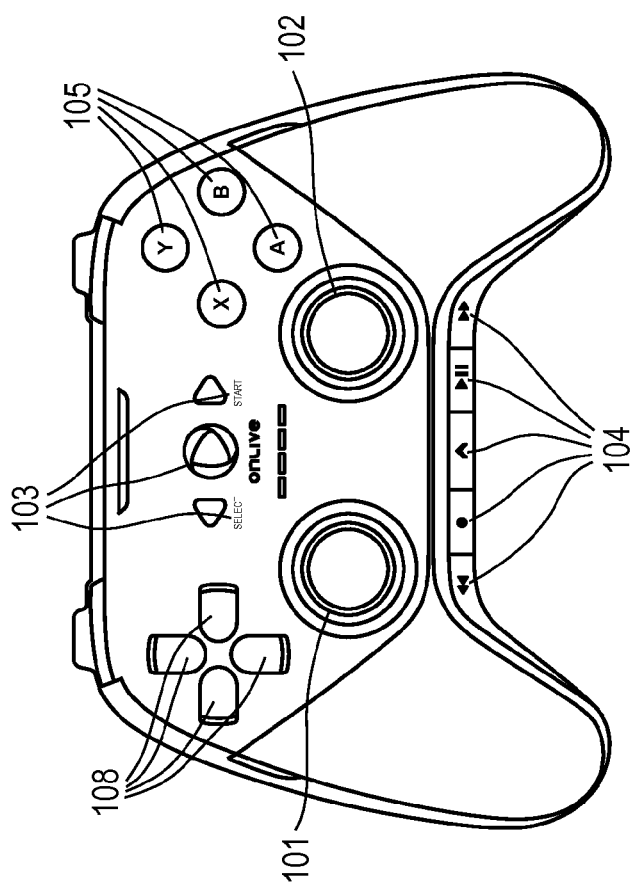

As illustrated in FIG. 1, one embodiment of a physical controller includes left and right joysticks 101 and 102, respectively, which may be freely moved in all directions to perform game input functions. For example, in an adventure game or first person shooter, the joysticks may be manipulated to move a character throughout the game. Also shown in FIG. 1 is a directional pad (commonly referred to as a D-pad) 108 to perform up, down, left, and right motion and/or cursor controls. A group of four action buttons 105 are provided to perform various application-specific functions (e.g., jump, run, switch weapons, etc). A set of transport buttons 104 positioned towards the bottom of the controller allow the user to perform play/pause, stop, fast forward, and rewind operations from within a game (e.g., to pause, fast forward, rewind, etc, within the game). A set of three navigation buttons 103 provided towards the middle of the controller may provide various different navigation functions and/or other system-specific functions. For example, in one embodiment, the central circular button causes a user navigation interface to appear overlaid on top of the current game; the left button is used to back out of menu items; and the right button is used to enter/select menu items. Of course, the underlying principles of the invention are not limited to any particular set of button functions. Bumper buttons 106a-b (sometimes referred to as shoulder buttons) and trigger buttons 107a-b provide various well-known game specific functions (e.g., fire, change weapon, reload, etc).

Figure 2:
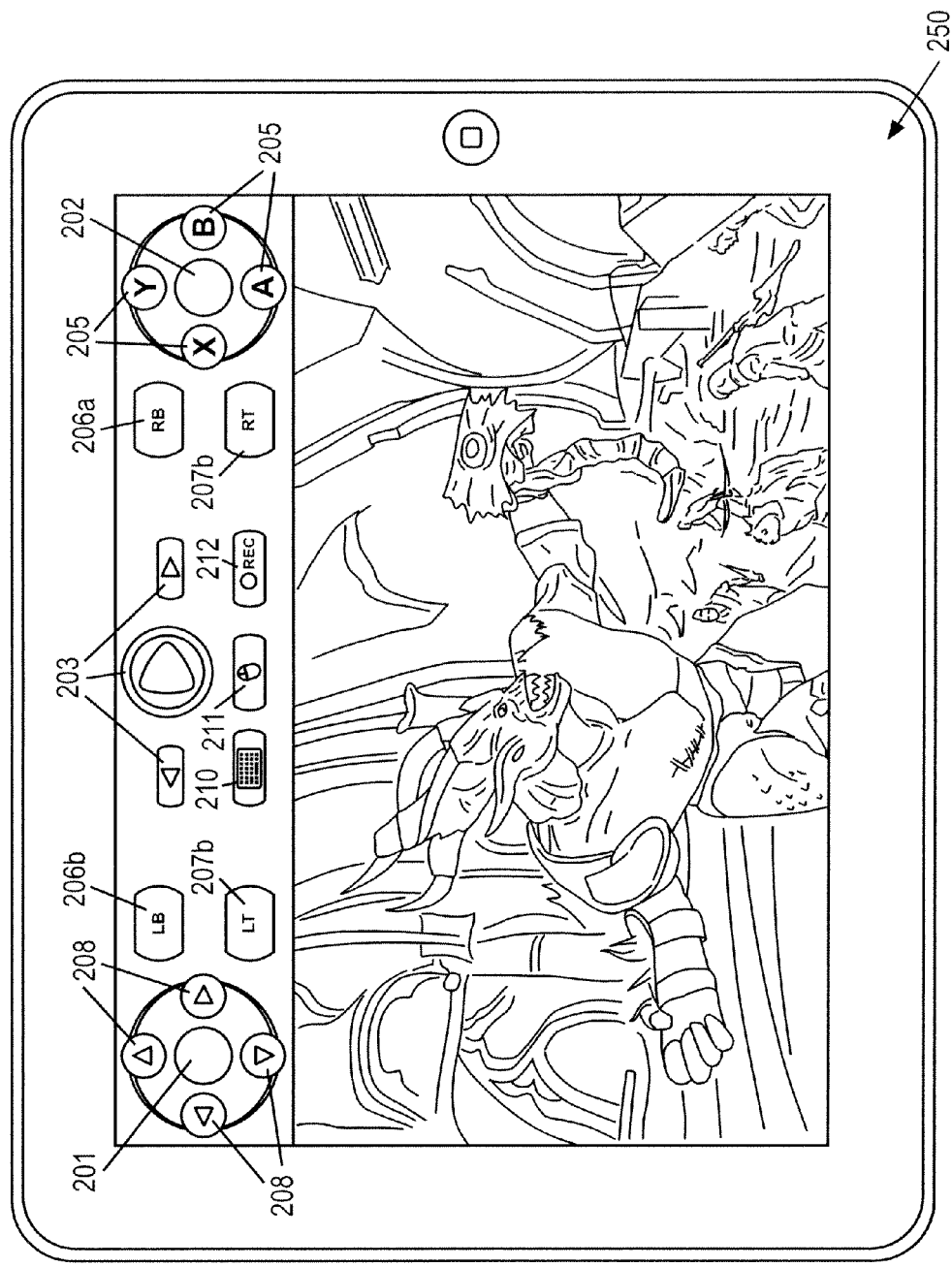
FIG. 2 illustrates a graphical user interface (GUI) for implementing a game controller on a touch screen device.

As illustrated in FIG. 2, one embodiment of a touch screen graphical user interface (GUI) includes a set of graphical buttons which visually correspond to the buttons on the physical controller illustrated in FIG. 1. Thus, using the embodiments described herein, a user who is familiar with the layout of the physical controller will find it relatively easy to identify the appropriate buttons and play a game on a touch screen device. In one embodiment, the touch screen device is an Apple iPad. However, the underlying principles of the invention may be implemented on any type of touch screen device (e.g., an Apple iPhone, Apple iPod, a Google Android, a Microsoft Windows, a Palm or Research in Motion Blackberry touch screen device, etc).

The numerical designations in FIG. 2 correspond to the numerical designations used in FIG. 1. For example, graphical joysticks 201-202 correspond to physical joysticks 101-102; the graphical directional pad 208 corresponds to the physical directional pad 108; the graphic action buttons 205 correspond to physical action buttons 105; the graphical navigation buttons 203 correspond to physical navigation buttons 103; the graphical bumper buttons 206a-b correspond to physical bumper buttons 106a-b; and the graphical trigger buttons 207a-b correspond to physical trigger buttons 107a-b. Unless otherwise stated herein, the graphical buttons perform the same functions as the corresponding physical buttons on the physical controller. Touching the joysticks 201-202 would indicate to the touch screen device that the user is intending to manipulate the joysticks, and subsequent motion while continuously touching the joystick 201-202 would be interpreted by the touch screen device as if the user had moved a physical joystick a similar distance from the center of the joystick. In one embodiment, a touch that is closer to the center of the joystick than to any other button is considered to the user touching the joystick and activating it, and a touch closer to another button is considered a touch of the other button. In one embodiment, a touch that activates the joystick is considered to define the center point position of the joystick, so that any subsequent motion from the center point is considered to be a movement away that center point. In another embodiment, a touch that activates the joystick is considered to have moved the joystick to the position of this first touch, and subsequent motion from this point is considered to have moved the joystick from that position. In one embodiment, there is an option where either the user or the game being played is able to select whether the first touch is interpreted as touching the joystick at its center point or moving the joystick to the position of the touch. The physical joysticks 101 and 102 may be equipped with a press down button capability, such that if the user presses down on a joystick, that downward press is detected. In one embodiment, the joysticks 201 and 202 are responsive to a "double tap", in which a rapid touch-touch action (with a limited time duration between the taps defined by the touch screen device, the game, or set by user as a setting, so as to distinguish a "double tap" from a release of the joystick followed by a retouch by the finger) is defined to be analogous to pressing down the physical joysticks 101 and 102. In one embodiment, such a "double tap" is only interpreted as such within a limited radius of the center of the joystick 201 or 202.

In one embodiment, touch of the buttons in FIG. 2 other than the joystick is interpreted as a press of the analogous button on the physical gamepad in FIG. 1. In one embodiment, if a button is pressed followed by a drag operation, then the drag is interpreted as an actuation ramp of a variable value. For example, on the physical gamepad in FIG. 1 the 107b and 107a ("Left Trigger" or "LT" and "Right Trigger" or "RT") buttons may be variable analog controls that may be used for purposes such as controlling the degree of acceleration of a car in a car game. If the user presses LT 207b or RT 207a, and then drags away from those buttons, the degree of drag would be interpreted as if the user had pressed button 107b or 107a to variable degree of actuation. In one embodiment, when the user drags after pressing 207b or 207a, a graphic gauge appears behind or near the button to indicate to the user the degree of actuation of the variable controller. Also illustrated in FIG. 2 is a graphical keyboard button which, when selected by the end user, causes a graphical keyboard to be displayed for entering text. In one embodiment, the online gaming service described in the co-pending applications communicates with the touch-screen device to automatically cause the graphical keyboard to appear when text entry is needed. Moreover, if the user touches a text entry field from within a game (or other application) the graphical keyboard may automatically appear.

A graphical mouse button 211 illustrated in FIG. 2 allows the user to move throughout the game as if the user of the touch-screen device were using a mouse. For example, in one embodiment, if the user touches and drags a thumb across the display screen on which the video game is displayed, a corresponding mouse control signal is transmitted from the touch-screen device to the online gaming service (e.g., dragging a thumb to the left causes a left mouse scroll operation). In one embodiment, selecting the mouse button 211 causes the button to toggle to a touch-screen button (e.g., indicated in the form of a graphical hand), thereby allowing the user to implement various functions specific to touch-screen technology (e.g., double-tap to select, double drag to zoom in/out, etc). In response, the touch-screen device will transmit touch-screen specific control signals to the online gaming service which will responsively control the current video game and transmit the resulting video stream to the touch-screen device.

A graphical record button 212 is also provided. In one embodiment, when selected, the record button causes the online gaming service to begin recording the user's game video output, or game actions. The recorded game video or game actions may then be used for many purposes as described in the co-pending applications, including Brag Clips™ video recordings, which, which are recordings of previous game play may be reviewed by the user and/or shared with others.

The button layout and functionality illustrated in FIG. 2 is beneficial for a variety of reasons. First, because the buttons are positioned at the top of the display (as opposed to the bottom), the user may use his/her thumbs to select the buttons and control the game while the remainder of the user's fingers are positioned under the touch-pad device (e.g., to hold the device securely during gameplay). Other than buttons 107a-b and 103 in FIG. 1, the other buttons and switches are usually controlled by the thumbs (and even 103 are sometimes controlled by the thumbs) and, so analogous thumb control of these buttons on a touch screen could be more familiar to a user than control by other fingers In addition, in one embodiment, when a user is actively controlling the joystick controls 201-202, the buttons 208, 205 surrounding the joystick controls and potentially other touch sensitive areas are "deactivated" while the user continues to manipulate the joystick. Thus, after the user touches the touch screen over the image of the joystick 201 or 202, and does not cease to touch the touch screen with that finger while moving the finger around, the touch screen device will consider that the joystick is still being manipulated, and despite the fact the finger may pass over another button, the touch screen device will not interpret that as a touch of the button underneath the finger, until the finger is lifted from the touch screen and again touches the touch screen. This allows the user to touch the joystick 201 or 202 and then have a wider area of motion to manipulate the joystick than would normally be possible if the motion were constrained to avoid moving over a button 205 or 208, resulting in the erroneous interpretation as a touch of that button. Also, given the intensity of many games, it allows the user to vigorously manipulate the joystick without fear of inadvertently hitting a nearby button, which might result in an undesired behavior in the game (e.g. inadvertently shooting an ally while using the joystick to turn quickly with an extreme motion).

In one embodiment, the range of that the user will be allowed to manipulate the joystick is limited to some specified distance from the center of the joystick, for example, to a circle of some radius around the joystick. The game could either cease to interpret the motion once the range of motion is exceeded (and the user could potentially realize because there was no corresponding action in the game beyond the allowable range of motion that the range had been exceeded), or there could be some other indication to the user, such as an auditory alert (e.g. a beep) or a graphical indication (e.g. a flash on the screen).

In one embodiment, when a joystick 201 or 202 is interpreted as activated, the nearby buttons are dimmed to be less prominent than they are usually (or some other graphical indication is used) to remind the user that touching the nearby buttons (without first releasing the joystick) will not be interpreted as a button press. For example, when the joystick 201 is activated, the D-pad buttons 208 would be dimmed out or when joystick 202 is activated one of the action buttons 205 would be dimmed out. When the user lifts his/her thumbs up from the joysticks, the D-pad buttons 208 or one of the action buttons 205 would become active again and would be restored to their normal appearance, providing a visual indication to the user that they can be actuated. In one embodiment, when the user lifts his/her fingers off of the graphical joysticks 201-202 as described, the graphical joysticks may be configured to be interpreted as (a) remaining in the last position they were in or (b) returning to a center position. In one embodiment, such state in the preceding sentence would be shown visually by the position that the joystick 201 or 202 graphical image is draw in.

Similarly, to the joystick 201 and 202 actuation being handled over nearby buttons in the preceding three paragraphs, dragging after pressing a button such as the LT 207b and RT 207a button could, in one embodiment, deactivate nearby buttons to allow motion that overlaps nearby buttons. Similar to the joystick 201 and 202 actuation, such dragging can be limited in range, and visual and/or auditory indicators can be provided to the user.

As mentioned above, in one embodiment the GUI shown in FIG. 2 is used to play remotely-operated games from a gaming service as described in the co-pending applications. In one embodiment, the communication with the online gaming service may occur over various network links including wireless links (e.g., digital 3G or 4G cellular links, Wi-Fi links, Bluetooth links, etc) and wired links (e.g., Ethernet, USB, etc).

In one embodiment, the game that is executing in the touch screen device or in a remotely-operated game requests the particular configuration of buttons so as to best suit the needs of the game.

In one embodiment, and non-game application is used, and it requests an interface suitable for its operation.

In one embodiment, the touch interface described herein is rendered by the local touch screen device. In another embodiment, the touch interface described herein is rendered by a remotely-operating game or application such as that described in the co-pending applications. In another embodiment part of the touch interface described herein is rendered locally and part is rendered remotely.

In one embodiment, the various graphical elements illustrated herein and the associated functions may be generated by a general purpose or a special purpose processor executing instructions. For example, a processor within the touch screen device may execute instructions to generate the graphical buttons shown in FIG. 2; receive user input from the touch screen; and responsively provide control signals to the online gaming service described in the co-pending applications. Embodiments of the invention may also include various steps as set forth above. The steps may be embodied in machine-executable instructions which cause a general-purpose or special-purpose processor to perform certain steps. Various elements which are not relevant to these underlying principles such as computer memory, hard drive, input devices, have been left out of some or all of the figures to avoid obscuring the pertinent aspects.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

The invention claims is:

1. A touch-screen apparatus comprising: a touch-screen display for displaying images and receiving user input in response to a user touching the touch screen display; a network interface for establishing a network connection with a gaming server executing a video game in response to user input from the apparatus, the gaming server compressing video output from the video game to generate interactive compressed streaming video, and transmitting the interactive compressed streaming video generated by the video game over the network connection to the touch-screen apparatus; a memory for storing program code and a processor for processing the program code to generate a touch-screen graphical user interface (GUI) comprising: a plurality of user input elements providing user input in response to the user selecting the user input elements on the touch screen display; wherein the user input is transmitted from the touch-screen apparatus to the gaming server to control the execution of the video game, wherein the user input elements include: one or more joystick control elements for receiving joystick-based input in response to a user touching the joystick control elements with a finger and dragging the finger along the surface of the touch screen display; a plurality of user input buttons surrounding the joystick control elements, the user input buttons providing user input in response to the user selecting the user input buttons on the touch screen display; wherein the joystick-based input and other user input is transmitted from the touch-screen apparatus to the gaming server to control the execution of the video game such that in response to a user touching and dragging one of the joystick control elements, the user input buttons surrounding the selected joystick control element become temporarily deactivated.

2. The apparatus as in claim 1 wherein the user input buttons become re-activated in response to the user removing a finger from the joystick control element.

3. The apparatus as in claim 1 wherein a center point position of a joystick control element is defined by a location on the touch-screen display at which the joystick control element is initially touched by the end user.

4. The apparatus as in claim 1 wherein a center point position of a joystick control element is defined in a consistent location on the touch-screen display regardless of the point at which the joystick control element is initially touched by the end user.

5. The apparatus as in claim 1 wherein a double-tap on a joystick control element by the end user results in user input indicating that the user has pressed downward on the joystick control element.

6. The apparatus as in claim 1 wherein the GUI comprises a left joystick control element displayed in a left region of the touch-screen display and a right control element displayed in a right region of the touch screen display.

7. The apparatus as in claim 6 wherein the user input buttons include a left trigger button displayed in the left region of the touch-screen display and a right trigger button displayed in the right region of the touch-screen display.

8. The apparatus as in claim 7 wherein in response to a user selecting the left trigger button or the right trigger button on the touch-screen display with a finger and dragging the finger, the resulting user input indicates that the user has actuated the left trigger button or the right trigger button by an amount proportional to the distance over which the finger is dragged.

9. The apparatus as in claim 8 wherein the GUI comprises a graphical gauge displayed behind or near the right trigger button or left trigger button to indicate to the user the degree of actuation.

10. The apparatus as in claim 1 wherein the GUI includes a mouse control mode in which, in response to a user touching and dragging at a random location of the touch-screen display, user input is generated to indicate a mouse movement in a direction corresponding to the direction of the dragging motion.

11. The apparatus as in claim 1 wherein one of the user input buttons comprises a record button causing the video game server to begin recording the interactive compressed streaming video.

12. The apparatus as in claim 1 wherein the user input buttons surrounding the joystick control element become dimmed to remind the user that the user input buttons are temporarily deactivated.

13. The apparatus as in claim 1 wherein in response to the user dragging one of the joystick control elements and then lifting a finger from the touch screen display, the resulting user input is interpreted to cause the joystick control element to remain in its current position prior to the user lifting the finger.

14. The apparatus as in claim 1 wherein in response to the user dragging one of the joystick control elements and then lifting a finger from the touch screen display, the resulting user input is interpreted to cause the joystick control element to return to a center position.

15. A non-transitory machine-readable medium having program code stored thereon to be executed on a touch-screen apparatus having a touch-screen display for displaying images and receiving user input in response to a user touching the touch screen display, a network interface for establishing a network connection with a gaming server executing a video game in response to user input from the touch-screen apparatus, the gaming server compressing video output from the video game to generate interactive compressed streaming video, and transmitting the interactive compressed streaming video generated by the video game over the network connection to the touch-screen apparatus, wherein program code is executable by the touch-screen apparatus to cause the apparatus to generate a graphical user interface comprising: a plurality of user input elements providing user input in response to the user selecting the user input elements on the touch screen display; wherein the user input is transmitted from the touch-screen apparatus to the gaming server to control the execution of the video game, wherein user input elements include: one or more joystick control elements for receiving joystick-based input in response to a user touching the joystick control elements with a finger and dragging the finger along the surface of the touch screen display; a plurality of user input buttons surrounding the joystick control elements, the user input buttons providing user input in response to the user selecting the user input buttons on the touch screen display; wherein the joystick-based input and other user input is transmitted from the touch-screen apparatus to the gaming server to control the execution of the video game such that in response to a user touching and dragging one of the joystick control elements, the user input buttons surrounding the selected joystick control element become temporarily deactivated.

16. The non-transitory machine-readable medium as in claim 15 wherein the user input buttons become re-activated in response to the user removing a finger from the joystick control element.

17. The non-transitory machine-readable medium as in claim 15 wherein a center point position of a joystick control element is defined by a location on the touch-screen display at which the joystick control element is initially touched by the end user.

18. The non-transitory machine-readable medium as in claim 15 wherein a center point position of a joystick control element is defined in a consistent location on the touch-screen display regardless of the point at which the joystick control element is initially touched by the end user.

19. The non-transitory machine-readable medium as in claim 15 wherein a double-tap on a joystick control element by the end user results in user input indicating that the user has pressed downward on the joystick control element.

20. The non-transitory machine-readable medium as in claim 15 wherein the GUI comprises a left joystick control element displayed in a left region of the touch-screen display and a right control element displayed in a right region of the touch screen display.

21. The non-transitory machine-readable medium as in claim 20 wherein the user input buttons include a left trigger button displayed in the left region of the touch-screen display and a right trigger button displayed in the right region of the touch-screen display.

22. The non-transitory machine-readable medium as in claim 21 wherein in response to a user selecting the left trigger button or the right trigger button on the touch-screen display with a finger and dragging the finger, the resulting user input indicates that the user has actuated the left trigger button or the right trigger button by an amount proportional to the distance over which the finger is dragged.

23. The non-transitory machine-readable medium as in claim 22 wherein the GUI comprises a graphical gauge displayed behind or near the right trigger button or left trigger button to indicate to the user the degree of actuation.

24. The non-transitory machine-readable medium as in claim 15 wherein the GUI includes a mouse control mode in which, in response to a user touching and dragging at a random location of the touch-screen display, user input is generated to indicate a mouse movement in a direction corresponding to the direction of the dragging motion.

25. The non-transitory machine-readable medium as in claim 15 wherein one of the user input buttons comprises a record button causing the video game server to begin recording the interactive compressed streaming video.

26. The non-transitory machine-readable medium as in claim 15 wherein the user input buttons surrounding the joystick control element become dimmed to remind the user that the user input buttons are temporarily deactivated.

27. The non-transitory machine-readable medium as in claim 15 wherein in response to the user dragging one of the joystick control elements and then lifting a finger from the touch screen display, the resulting user input is interpreted to cause the joystick control element to remain in its current position prior to the user lifting the finger.

28. The non-transitory machine-readable medium as in claim 15 wherein in response to the user dragging one of the joystick control elements and then lifting a finger from the touch screen display, the resulting user input is interpreted to cause the joystick control element to return to a center position.

* * * * *